United States Patent [19]

Dawes

[11] 3,912,599

[45] Oct. 14, 1975

[54] PROCESS FOR THE PURIFICATION OF PIVALOLACTONE

[75] Inventor: John L. Dawes, Longview, Tex.

[73] Assignee: Eastman Kodak Company, Rochester, N.Y.

[22] Filed: Nov. 3, 1972

[21] Appl. No.: 303,442

[52] U.S. Cl. ................................ 203/61; 260/343.9
[51] Int. Cl.$^2$ .................... C07D 305/12; B01D 3/34
[58] Field of Search ..................... 260/343.9; 203/61

[56] References Cited
UNITED STATES PATENTS 3,000,906   9/1961   Hasek et al. ..................... 260/343.9

*Primary Examiner*—Paul M. Coughlan, Jr.
*Assistant Examiner*—Anne Marie T. Tighe
*Attorney, Agent, or Firm*—Edward R. Weber; Cecil D. Quillen, Jr.

[57] ABSTRACT

The present invention relates to a process for the purification of pivalolactone from a mixture of pivalolactone and isobutyric acid by vacuum extractive distillation utilizing an organic extraction solvent which may be completely miscible with both other components. A preferred extraction solvent is 2-ethylhexanoic acid. The technique is functional for wide variations in the composition of the mixture of the two components and over a broad range of temperatures.

8 Claims, No Drawings

PROCESS FOR THE PURIFICATION OF PIVALOLACTONE

The present invention relates to a process for isolating pure pivalolactone from a mixture of pivalolactone and isobutyric acid by vacuum extractive distillation utilizing as an extractive agent an organic solvent which may be completely miscible with each of the components of the mixture. A preferred extractive agent is 2-ethylhexanoic acid.

Pivalolactone is useful in the polymer industry as a starting material for synthetic resins, synthetic fibers, and engineering plastics. Prior to polymerization, however, the pivalolactone monomer must be isolated from other compounds occurring during the production reaction, such as isobutyric acid, if it is to be used in the production of high quality products. Unfortunately, isobutyric acid and pivalolactone are extremely difficult to separate since they form an azeotrope and boil very close to one another over a wide pressure range. For example, the boiling range separation of pivalolactone and isobutyric acid will vary only from 0° to 4°C. over a pressure range of from about 10 mm mercury to about 760 mm mercury. Thus, previous methods of purifying pivalolactone have involved straight extraction utilizing immiscible solvents having a preferential solubility for either pivalolactone or the impurities, or reaction of the impurities with a third compound to change the impurity to another compound more readily separated from the pivalolactone. Obviously, these techniques require additional processing steps which in turn add to manufacturing costs and may introduce or produce additional impurities.

Therefore, an object of this invention is to provide a simplified method for the separation of pivalolactone from isobutyric acid.

Another object of this invention is to provide a method for the separation of pivalolactone from isobutyric acid which can be conducted in a continuous fashion.

Yet a third object of this invention is to provide a method of separating high purity pivalolactone from isobutyric acid which can accommodate wide variations in the composition of the isobutyric acid/pivalolactone mixture.

Other objects and advantages of the invention will become apparent from a consideration of the specification and claims of this application.

According to the method of this invention, a stream comprising isobutyric acid and pivalolactone is fed into the extractive distillation column operated under a reduced pressure of from about 1 mm to about 100 mm at the point in the column wherein the composition of the mixture in the column is about the same as the composition of the feed stream. Simultaneously, an extraction solvent is introduced near the top of the distillation column. Sufficient trays should be allowed above the point at which the extraction solvent is introduced to prevent carry-over of the extraction solvent from the top of the column. The temperature and pressure of the distillation column are selected by methods well-known in the art so that the temperature of the column at the feed plate is less than the temperature at which significant amounts of isobutyroxypivalic acid is formed, and the temperature at the top of the column is less than the temperature at which pivalolactone begins to polymerize. For example, when a 30/70 mix of pivalolactone/isobutyric acid is run in a column where the pressure at the top of the column is 9 mm, the top temperature will be about 50°C. and the temperature at the feed plate about 76°C.

The extractive solvent serves two critical functions in that it associates with the isobutyric acid in such a manner as to destroy the pivalolactone/isobutyric acid azeotrope, and simultaneously reduces the vapor pressure of the isobutyric acid so that pure pivalolactone can be obtained overhead. Thus, the extraction solvent is sealed from the group of lower aliphatic, straight or branched chain, monofunctional organic acids which are inert to the feed stream under the conditions of the purification (i.e., it does not enter into any appreciable reaction therewith which produces significant amounts of undesirable side products) and have the properties of destroying the isobutyric acid/pivalolactone azeotrope while at the same time reducing the vapor pressure of isobutyric acid. These organic acid extraction solvents are of the high boiling type (i.e., they have a boiling point greater than about 165°C. at 760 mm and a melting point of less than about 40°C.), and generally contain a carbon backbone of from about 3 to about 8 carbon atoms. The carbon backbone may contain substitutions therein of one or more lower aliphatic carbon radicals of from 1 to 5 carbon atoms such as methyl, ethyl, propyl, etc. Preferred extraction solvents which fit these requirements include 2-ethylhexanoic acid, hexanoic acid, heptanoic acid, octanoic acid, and the like, with 2-ethylhexanoic acid being particularly preferred.

Normally it is desirable to reclaim the extractive solvent so that it can be recycled through the extractive distillation column. At the same time it is also desirable to reclaim the isobutyric acid for use in other reactions. This can be done through the use of a simple distillation of the bottoms stream utilizing conventional distillation methods. Thus, if the bottoms from the extractive distillation column are fed to a distillation column operated at atmospheric pressure, the isobutyric acid will be recovered overhead and the extractive solvent will be recovered from the bottom of the column.

In certain instances, it may also be desirable to use two or more extractive distillation columns if an extremely pure pivalolactone product is desired or if it is desirable to use a lower feed rate of extractive solvent to each column. The use of a plurality of columns can be accomplished by connecting the columns so that the overhead from one column is fed at the appropriate point, as previously disclosed, of the succeeding column. In this case, the bottoms from each extractive distillation column can be fed to an extractive solvent recovery column as described above.

Because of the unique capability of this purification system, a broad range of compositions of isobutyric acid/pivalolactone mixtures can be processed. The feed composition of isobutyric acid to pivalolactone may range from a ratio of 1.0:99.0 to 99.0:1.0, with substantially pure pivalolactone being obtained in all cases. As would be expected, when the ratio of isobutyric acid/pivalolactone is in the range of 99.0:1.0, the amount of extractive solvent feed to the upper feed tray of the first column must be greater than when the ratio is in the lower range of 1.0:99.0. Obviously, more extractive solvent per milliliter of feed composition can be used if such is desirable or necessary and the optimum ratio for any feed composition can easily be determined by known methods. It will be desirable to vary the point at which each feed composition is fed into the column as previously discussed. The optimum feed point is easily determined by methods well-known in the distillation art.

The process of this invention is illustrated in greater detail by the following examples, but it will be understood that these examples are not intended to limit the invention in any way and obvious modifications will occur to those skilled in the art.

EXAMPLE 1

A distillation apparatus consisting of a 45-plate column is set up with feed plates at fifteenth and fortieth plates from the base. The column is run at a vacuum of 25 mm mercury, and a 9:1 reflux ratio. A mixture containing 70 weight percent isobutyric acid and 30 weight percent pivalolactone is fed at the 15th plate, where the temperature is about 83°C., at the rate of 65 ml. per hour. 2-Ethylhexanoic acid is fed at the 40th plate, where the temperature is about 72°C., at 150 ml. per hour. Pivalolactone is recovered overhead at a temperature of about 63°C., and a rate of 18 ml. per hour. This pivalolactone is found to be chromatographically free from isobutyric acid. In excess of 97 percent of the pivalolactone fed is obtained overhead.

Obviously a multistage extractive distillation would also be functional. The following example illustrates a two-stage operation.

EXAMPLE 2

Using a pair of columns similar to the column described in Example 1, a solution containing 30 weight percent pivalolactone and 70 weight percent isobutyric acid is fed to the first column at the rate of 60 ml. per hour at the 15th plate. The first column is run at 25 mm mercury and a 4:1 reflux ratio. Temperatures are the same as in Example 1. 2-Ethylhexanoic acid is fed at the rate of 60 ml. per hour on the 40th plate. Essentially 100 percent of the pivalolactone in the feed stream is taken overhead. The overhead product is found to contain 80 weight percent pivalolactone and 20 weight percent isobutyric acid. The overhead from the first column is fed to the 15th plate of the second column, also operated at 25 mm mercury vacuum and 4:1 reflux ratio. 2-Ethylhexanoic acid is fed to the 40th plate of this second column at the rate of 120 ml. per hour. Pivalolactone is recovered overhead from the second column. This pivalolactone is found to be chromatographically pure. The yield is in excess of 97 percent of pivalolactone fed to the first column.

EXAMPLE 3

Example 1 is repeated except that the column is run at 9–10 mm pressure and the temperatures are suitably adjusted. That is, the base temperature is adjusted to about 102°C., and the overhead temperature to about 50°C. A 30 percent pivalolactone/70 percent isobutyric acid by weight mixture is fed to the lower feed plate at 60 ml. per hour. 2-Ethylhexanoic acid is fed to the upper feed plate at 120 ml. per hour. 99+ percent Pivalolactone is obtained overhead from the column at a rate of 18 ml. per hour.

EXAMPLE 4

Using the column of Example 1 a mixture of 85 percent isobutyric acid/15 percent pivalolactone by weight is fed to the lower feed plate of the first column (operated at 15 mm pressure, base temperature 109°C., overhead temperature 57°C.) at 80 ml. per hour. 2-Ethylhexanoic acid is fed to the top feed plate at 160 ml. per hour. The overhead is 99+ percent pure pivalolactone.

This invention has been described in detail with particular reference to certain preferred embodiments thereof, but it will be understood that variations and modifications can be effected within the spirit and scope of the invention as described hereinabove.

We claim:

1. A process for separation of pivalolactone from impure mixtures of pivalolactone and isobutyric acid which impure mixtures have a ratio of pivalolactone to isobutyric acid of from about 1.0:99.0 to about 99.0:1.0 whereby
   1. the impure mixture is fed into an extractive distillation column at an intermediate point selected so that the composition of the material in the extractive distillation column at the feed point approximates the composition of the impure material fed to the column;
   2. introducing at a point near the top of the said extractive distillation column an extraction agent selected from the group consisting of lower aliphatic, straight- or branched-chain, monofunctional carboxylic acids having a carbon backbone of from 3 to 8 carbon atoms and optionally side chains of 1 to 5 carbon atoms which extractive agent has the properties of being inert to the components of the feed stream under the condition of the separation, destroying the isobutyric acid/pivalolactone azeotrope and reducing the vapor pressure of isobutyric acid;
   3. operating the said extractive distillation column at a pressure of from about 1 mm to about 100 mm which pressure has been selected so that the temperature of the column at the point wherein the impure mixture is introduced is less than the temperature at which isobutyroxypivalic acid is formed and the temperature at the top of the column is less than the temperature at which polymerization of pivalolactone commences; and
   4. recovering from the top of said column a stream enriched in pivalolactone.

2. The process of claim 1 wherein the organic acid extraction agent has a boiling point greater than about 165°C. at 760 mm pressure and a melting point of less than about 40°C.

3. The organic acid extraction agent of claim 1 wherein the acid has one or more lower aliphatic carbon radicals of from 1 to 5 carbon atoms as branching groups off the carbon backbone.

4. The process of claim 1 wherein the extractive solvent is selected from the group consisting of 2-ethylhexanoic acid, hexanoic acid, heptanoic acid, and octanoic acid.

5. The process of claim 4 wherein the extractive solvent is 2-ethylhexanoic acid.

6. The process of claim 1 wherein the pressure is from about 5 mm mercury to about 50 mm mercury.

7. The process of claim 1 wherein the overhead recovered from the distillation column is essentially pure pivalolactone.

8. The process of claim 1 wherein the overhead from the first distillation column is fed to one or more subsequent distillation columns operated under conditions similar to said first distillation column so that the overhead from the final distillation column is essentially pure pivalolactone.

* * * * *